(12) United States Patent
Adoline

(10) Patent No.: US 9,032,587 B2
(45) Date of Patent: May 19, 2015

(54) UNIVERSAL STOP TUBE

(71) Applicant: Barnes Group Inc., Bristol, CT (US)

(72) Inventor: Jack Adoline, Holland, OH (US)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 14/170,868

(22) Filed: Feb. 3, 2014

(65) Prior Publication Data

US 2014/0223692 A1   Aug. 14, 2014

Related U.S. Application Data

(60) Provisional application No. 61/762,383, filed on Feb. 8, 2013.

(51) Int. Cl.
*E05F 3/22* (2006.01)
*E05F 1/10* (2006.01)
*F16F 9/56* (2006.01)

(52) U.S. Cl.
CPC .............. *E05F 3/22* (2013.01); *Y10T 16/593* (2015.01); *Y10T 16/61* (2015.01); *Y10T 16/27* (2015.01); *Y10T 16/281* (2015.01); *E05F 1/1091* (2013.01); *E05Y 2201/218* (2013.01); *E05F 1/10* (2013.01); *E05F 3/221* (2013.01); *E05Y 2900/136* (2013.01); *F16F 9/56* (2013.01)

(58) Field of Classification Search
USPC .......... 16/49, 66, 70, 72, 71, 78, 80, 82, 84, 85
See application file for complete search history.

(56) References Cited

U.S. PATENT DOCUMENTS

| | | | |
|---|---|---|---|
| 3,708,825 A * | 1/1973 | Wood | 16/66 |
| 4,639,969 A | 2/1987 | Obenshain | |
| 4,813,100 A * | 3/1989 | King | 16/49 |
| 4,815,163 A | 3/1989 | Simmons | |
| 5,575,513 A | 11/1996 | Tuttle | |
| 5,592,780 A | 1/1997 | Checkovich | |
| 5,659,925 A | 8/1997 | Patterson | |
| 7,730,579 B2 * | 6/2010 | Coe | 16/66 |
| 2002/0066229 A1 * | 6/2002 | Rubio | 16/66 |

* cited by examiner

*Primary Examiner* — Jeffrey O Brien
(74) *Attorney, Agent, or Firm* — Fay Sharpe LLP

(57) ABSTRACT

A strut assembly is provided including a holding and releasing mechanism adapted to be attached to a cylinder-type closer. The mechanism comprises the strut assembly including a strut cylinder, a strut rod, a pivot block, and a locking tube. The strut assembly further comprises a stop tube including a clip at a first end and a collar at a second end. The stop tube further includes a rigid angled ramp connecting the clip and the collar. The clip moves from a first position to a second position while pivoting the locking tube at a first end in order to engage the locking tube at another end with the strut cylinder thereby holding the strut assembly in an extended position.

22 Claims, 8 Drawing Sheets

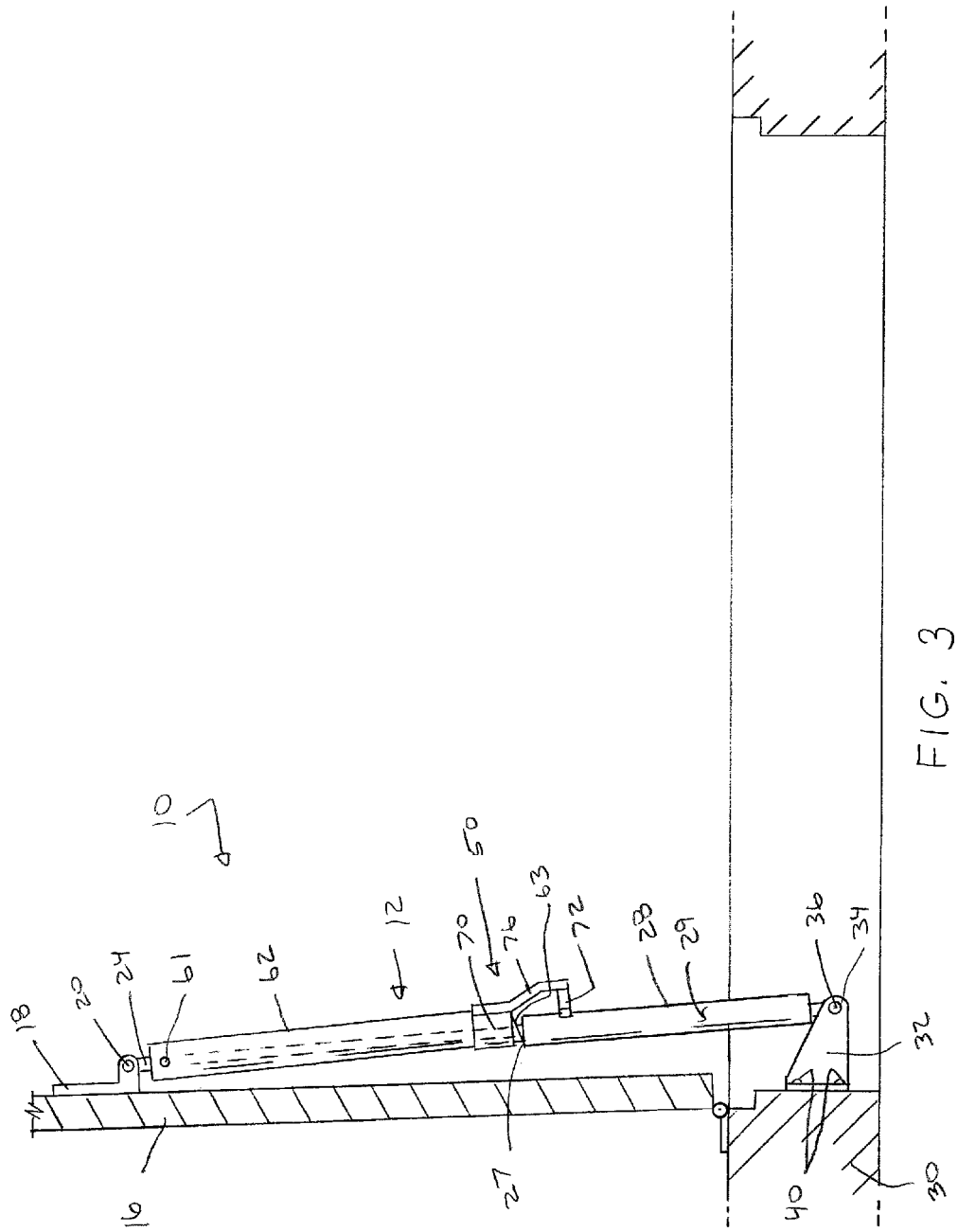

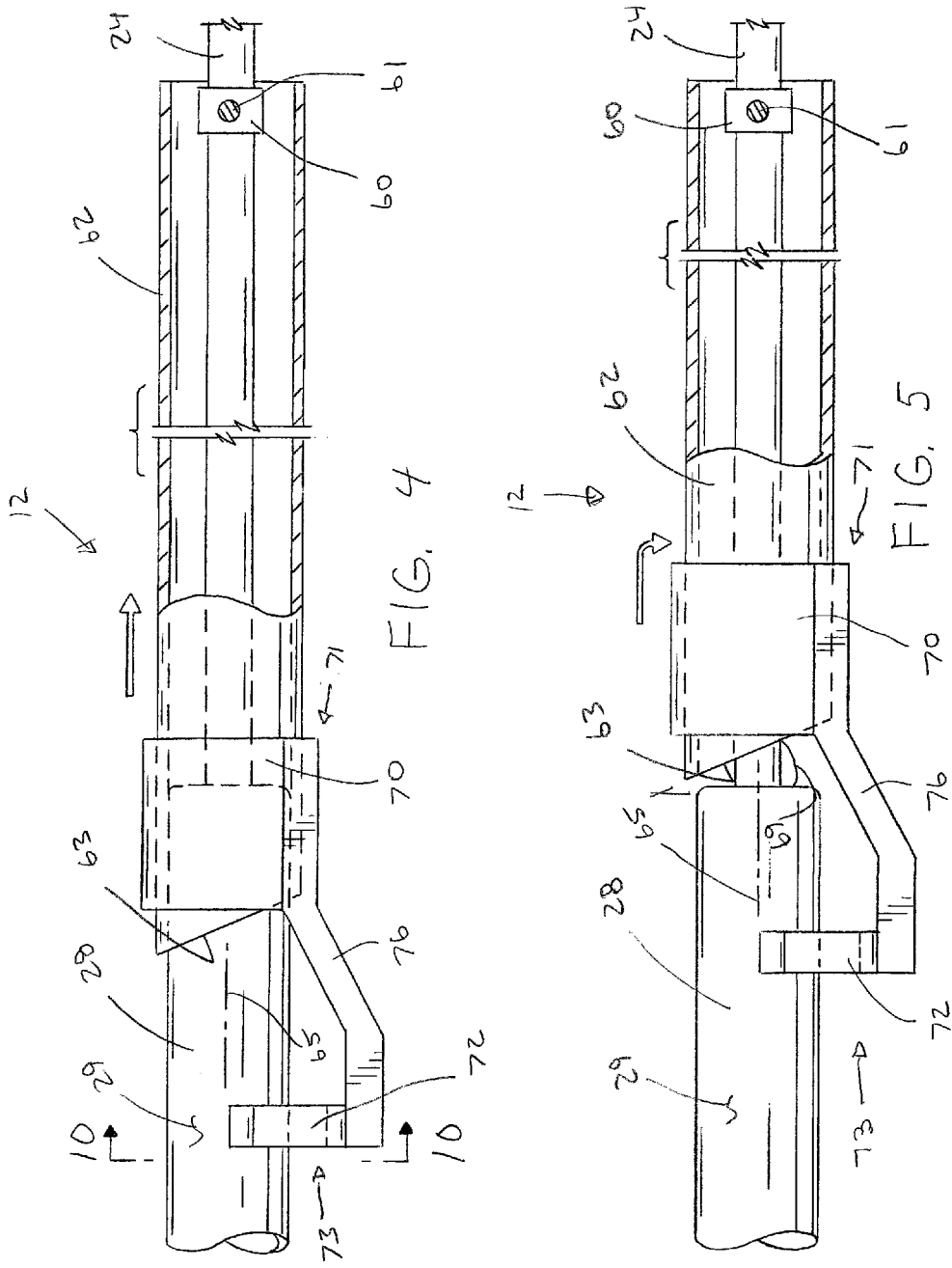

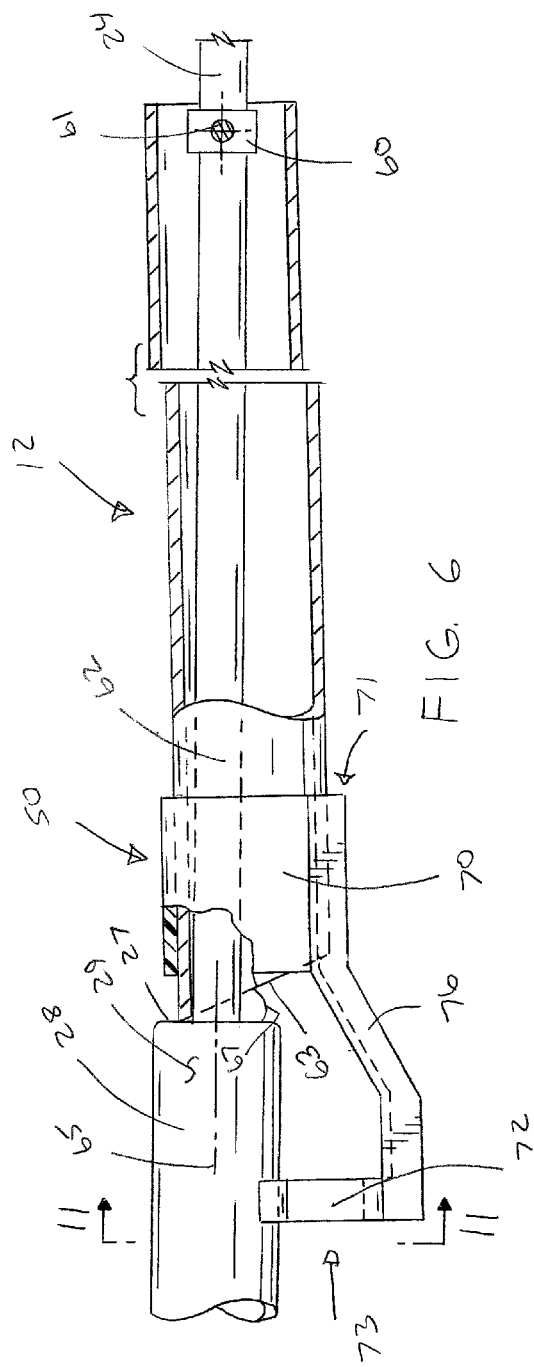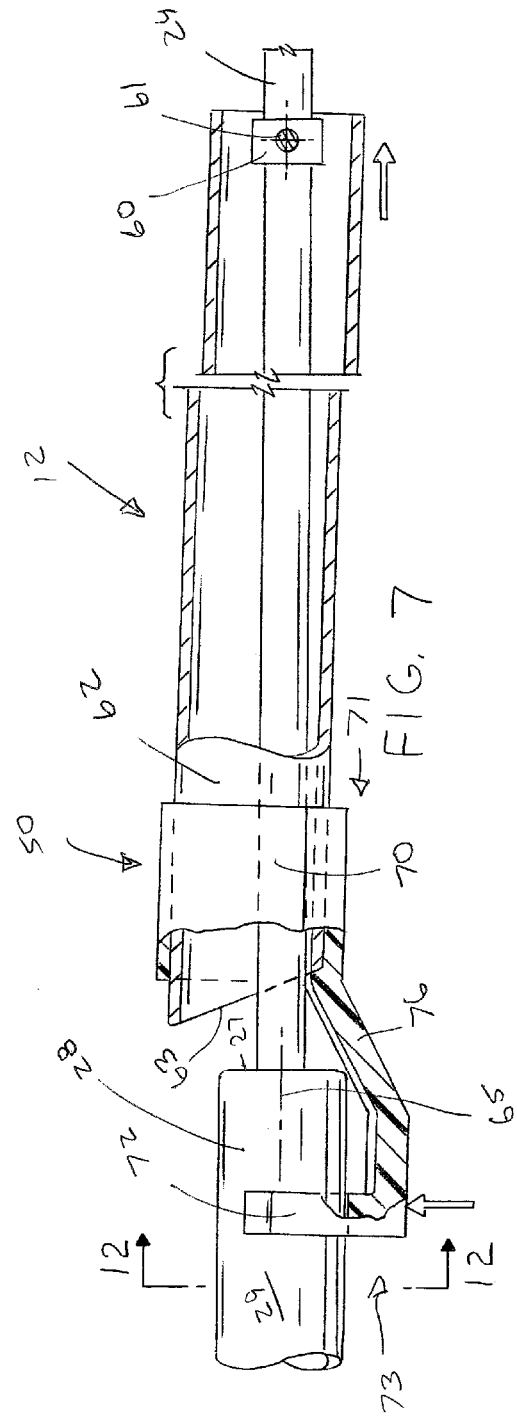

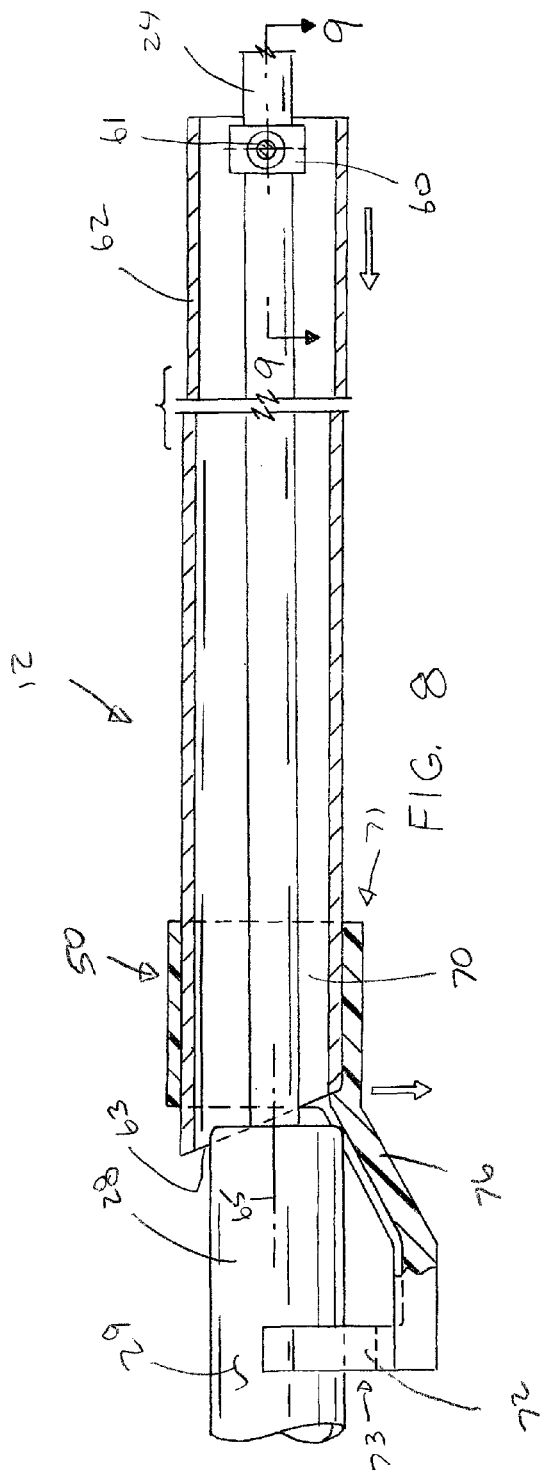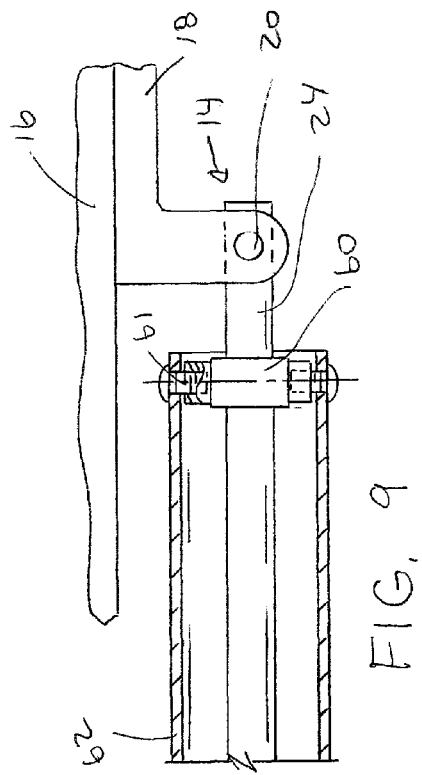

UNIVERSAL STOP TUBE

FIELD OF THE INVENTION

The invention relates in general to the difficulty of manipulating a self-closing strut under certain conditions. The present invention relates to universal stop tubes and strut assemblies; for example, door holders and door closers. The present disclosure provides improvements in holding open and facilitating closure of struts, door holders, and closers for use in all types of doors, latches, and lids, etc. The present disclosure provides a device for maintaining a strut assembly in a particular self-actuated, opened, and locked orientation and facilitating closure subsequent thereto.

BACKGROUND OF THE INVENTION

Door and latch closures, as well as strut closures, are known in the art. Strut assemblies or holders are utilized for holding side pivoted, i.e., hinged doors open against the self-closing action (or other closing action) of such a door closer. This closing action of the door closer or strut can be actuated by mechanical springs, nitrogen gas struts, gas springs, etc., which can be either elongated or compressed, depending on the type of mechanism.

Self-closing mechanisms typically comprise a cylinder or strut connected at one end to a frame, a spring-loaded piston rectilinearly displaceable in the cylinder or strut, and a piston rod fixed to the piston and extending from the second end of the cylinder. The free end of the piston rod is rotatably or pivotally connected to a door itself (or other movable lid or latch).

Certain types of self-closing mechanisms function as air enters the cylinder freely as the door is opened. The air escapes at a controlled rate through an orifice as the door or lid is closed by the force of the spring, thus slowing the rate at which the door or lid is closed by an air cushioning or damping action, much like a gas spring.

The more advanced of the known door closers have a mechanism for holding the door open after it has been manually swung open to a predefined position. This allows for a person to conveniently walk through a door without having to continuously overcome the force of the closing spring. One of the only complaints in the use of such door closers is the ease (i.e. lack thereof) with which a person can set the door closer to stay open or conversely, the ease (i.e. lack thereof) with which a door being held open can be released.

Screen doors, storm doors and the like, are utilized in millions of homes to provide fresh air, weather protection, and security, etc. The door typically includes a means for closing the door such as a spring or piston assembly or the like.

A popular means for controlling the door position utilizes a piston assembly which typically includes a cylindrical tube attached at one end to a bracket connector on the door. The inner surface of the cylindrical tube generally includes a spring-loaded piston attached to a reciprocating connecting rod which extends from the piston and out of the tube. The end of the connecting rod opposite to the end carried and connected within the cylindrical tube typically is attached to a bracket which is connected to the door frame. When the door is opened, the connecting rod is pulled from the cylindrical tube, causing the piston to travel within the inner surface of the cylinder and thereby compress a spring coiled between an inner wall of the cylinder and the piston. When the door is released, energy stored within the spring pushes against the surface of the piston, causing it to slide within the cylinder and the connecting rod is drawn back within the cylindrical tube thereby closing the door. The retracting momentum of the piston is typically cushioned by compression of fluid, such as air or oil inside the cylinder tube, to create a damping resistance opposite the force that propels the door to close for better control of the speed and force at which the door closes.

Many different devices have been invented in order to maintain the door in a certain position, i.e., partially or completely open. One such device is a hold-open washer which has an aperture through which the connecting rod extends. The hold-open washer must be manually set once the door is opened at a position along the connecting rod. After the door is released, the connecting rod begins to be drawn back within the cylinder and is stopped when the hold-open washer makes contact with the end of the cylinder, binding the hold-open washer against the piston rod. The door will remain held in place until the door is opened and the hold-open washer is manually repositioned transversely along the connecting piston rod and away from the cylindrical tube.

U.S. Pat. No. 3,708,825 relates to a door check and door stop combination. The door check is made up of a pneumatic cylinder and piston which controls the rate at which the door closes to prevent the door from slamming. A stop is attached to the distal end of the piston rod and lies along the side of the cylinder. The stop is made of a sheet material and has an aperture through it which receives the cylinder. The stop has a handle which may be engaged by the user's hand to move the stop from a position that is in engagement with the cylinder.

U.S. Pat. No. 4,639,969 relates to door closer mechanism for attachment to, or incorporation into, a standard spring-type door closer, or for use with a standard spring-type door closer. A reversible pawl and ratchet assembly operating on a rod between the door and door casing allows the door to ratchet open where it is held by the pawl until a slight closing pull or push on the door reverses the action of the pawl and allows the door to close. While the door is closing or is fully closed, reopening of the door resets the pawl for again holding the door open as desired.

U.S. Pat. No. 4,815,163 relates to a storm door lock apparatus set forth wherein a clamp is secured to an associated screen door-type closure member that further secures a slidable rod mounted with an abutment surface for actuation by a user with a pivoted lever at the other end of said rod for canting about a piston rod associated with a door closure. Additionally, a generally "L" shaped link is securable to the abutment member for allowing engagement and access by a user.

U.S. Pat. No. 5,575,513 relates to a receptacle for propping the cylinder of a cylinder-and-plunger strut in extended position of the strut includes two side-by-side cylindrical chambers, one being of a size to embrace the jack plunger rod, but not the jack cylinder, and the other chamber being of a size to slide over the jack cylinder, which chambers are interconnected by a slot sufficiently narrower than the jack plunger rod to enable the receptacle to move into a position embracing the jack plunger rod by snap action, and the larger chamber being of a size to slide lengthwise over the cylinder and having in it a lengthwise slot sufficiently narrow so as not to be able to pass the cylinder through it but sufficiently wide to pass the plunger rod through it.

U.S. Pat. No. 5,592,780 relates to an apparatus for controlling the position of a door suitable for use in association with door closing piston assemblies having a spring-biased reciprocable door closing piston rod and a latch plate transversely slidable along the length of the piston rod.

U.S. Pat. No. 5,659,925 relates to a holding mechanism attached to a generic door closing cylinder.

There are various disadvantages inherent in all of these prior art devices. To Applicant's knowledge, none of the prior art devices can be automatically locked open and released by simply moving the door without manual intervention. The prior art devices are often rather clumsy to manipulate when attempting to set or release a latch. Other disadvantages of the prior art devices are that they are rather complicated, hard to maintain, and expensive to produce.

There is a need for a more convenient door and strut closers and holders, which require little effort from a person to enable the door or strut to remain open or to close the door or strut and which can even be retrofitted to existing door and strut closers without increasing the complexity and cost of manufacturing. The present invention is directed at further solutions to address this need.

SUMMARY OF THE INVENTION

The present disclosure, to be described in more detail hereinafter, provides for a device that attaches directly to a generic closing cylinder or strut assembly, for example, that allows a person to secure a strut in place simply by opening the strut to a predetermined extent. Once the strut's predetermined extent is reached, a stop tube automatically activates a locking tube to hold the strut in an extended position. The strut can then be compressed by a one-step push on a stop tube which enables the strut to enter the locking tube.

The present invention discloses and describes a device including a hold-open apparatus or universal stop tube which can be used in combination with a screen or storm door piston assembly.

In accordance with one non-limiting aspect of the present invention, a universal stop tube is provided that can be retrofitted to most common spring-loaded cylinder or strut assemblies and which provides the force to automatically activate and hold open the strut assembly. The universal stop tube apparatus is generally of a durable and reliable construction and can be easily and efficiently manufactured. The apparatus is designed so that is can be retrofitted to most common existing storm or screen door closing devices with minimal effort.

In accordance with another non-limiting aspect of the present invention, the universal stop tube works in association with a locking tube (having an angled face at one end) in order to automatically hold the spring-loaded cylinder in a desired open position.

In accordance with yet another non-limiting aspect of the present invention, the strut includes a flexible clip which facilitates disengagement of the locking tube and respective unassisted self-closing of the strut assembly.

In accordance with a further non-limiting aspect of the present invention, the stop tube provides an automatic reset response or realignment when the stop tube is partially closed after disengagement of the locking tube.

In accordance with yet another non-limiting aspect of the present invention, the strut assembly includes a holding and releasing mechanism adapted to be attached to a cylinder-type closer. The strut assembly generally includes a strut cylinder, a strut rod, a pivot block, and a locking tube. The strut assembly further comprises a stop tube including a clip at a first end and a collar at a second end. The stop tube further includes a rigid angled ramp connecting the clip and the collar. The clip moves from a first position to a second position while pivoting the locking tube at a first end in order to engage the locking tube at another end with the strut cylinder thereby holding the strut assembly in an extended position.

In yet another non-limiting aspect of the present invention, the strut assembly includes a holding and releasing mechanism adapted to be attached to a cylinder-type closer. The strut assembly generally includes a strut cylinder, a strut rod, a pivot block, and a locking tube. The strut assembly further comprises a stop tube including a clip at a first end and a collar at a second end. The stop tube further includes a rigid angled ramp connecting the clip and the collar. The clip moves from a first position to a second position while pivoting the locking tube at a first end in order to engage the locking tube at another end with the strut cylinder thereby holding the strut assembly in an extended position wherein the stop tube includes an angled second end distal to a mounting frame bracket.

In a further aspect of the present invention, the strut assembly includes a holding and releasing mechanism adapted to be attached to a cylinder-type closer. The strut assembly generally includes a strut cylinder, a strut rod, a pivot block, and a locking tube. The strut assembly further comprises a stop tube including a clip at a first end and a collar at a second end. The stop tube further includes a rigid angled ramp connecting the clip and the collar. The clip moves from a first position to a second position while pivoting the locking tube at a first end in order to engage the locking tube at another end with the strut cylinder thereby holding the strut assembly in an extended position. The stop tube includes an angled second end distal to a mounting frame bracket. The locking tube is pivotally engaged at the first end to the strut rod proximal to the mounting frame bracket.

It is one non-limiting object of the present invention to provide an improved device for holding open and facilitating closure of struts, door holders, and closers for use in all types of doors, latches, and lids, etc.

It is another non-limiting object of the present invention to provide a device for maintaining a strut assembly in a particular self-actuated, opened, and locked orientation and facilitating closure subsequent thereto.

It is still another non-limiting object of the present invention to provide a device that attaches directly to a generic closing cylinder or strut assembly and that allows a person to secure a strut in place simply by opening the strut to a predetermined extent.

It is yet another non-limiting object of the present invention to provide a device including a hold-open apparatus or universal stop tube which can be used in combination with a screen or storm door piston assembly.

It is still yet another non-limiting object of the present invention to provide a device that can be retrofitted to most common spring-loaded cylinder or strut assemblies and which provides the force to automatically activate and hold open the strut assembly.

It is another non-limiting object of the present invention to provide a device that works in association with a locking tube in order to automatically hold the spring-loaded cylinder in a desired open position.

It is still another non-limiting object of the present invention to provide a device that includes a flexible clip which facilitates disengagement of the locking tube and respective unassisted self-closing of the strut assembly.

It is yet another non-limiting object of the present invention to provide a device that provides an automatic reset response or realignment when a stop tube is partially closed after disengagement of the locking tube.

These and other objects, features and advantages of the present invention will become apparent from the subsequent description taken in conjunction with the accompanying drawings.

BRIEF DESCRIPTION OF THE DRAWINGS

Reference may now be made to the drawings, which illustrate various non-limiting embodiments that the invention may take in physical form and in certain parts and arrangements of parts wherein:

FIG. 4 is a partial cross sectional view of the strut assembly and the door in the intermediate position;

FIG. 5 is a partial cross sectional view of the strut assembly and the door in the fully open position;

FIG. 6 is a partial cross sectional view of the strut assembly and universal stop tube in the operative stop hold position;

FIG. 7 is a partial cross sectional view of the strut assembly in the released and closing position;

FIG. 8 is another partial cross sectional view of the strut assembly in the released and closing position;

FIG. 9 is a partial cross sectional view taken along line 9-9 of FIG. 8;

DETAILED DESCRIPTION OF THE INVENTION

Numerous households utilize a storm, screen or a like door to moderate or protect the interior of a house from heat, cold air, insects, etc. Typically, the door is biased in a closed position utilizing a door closer assembly.

Figure 1:
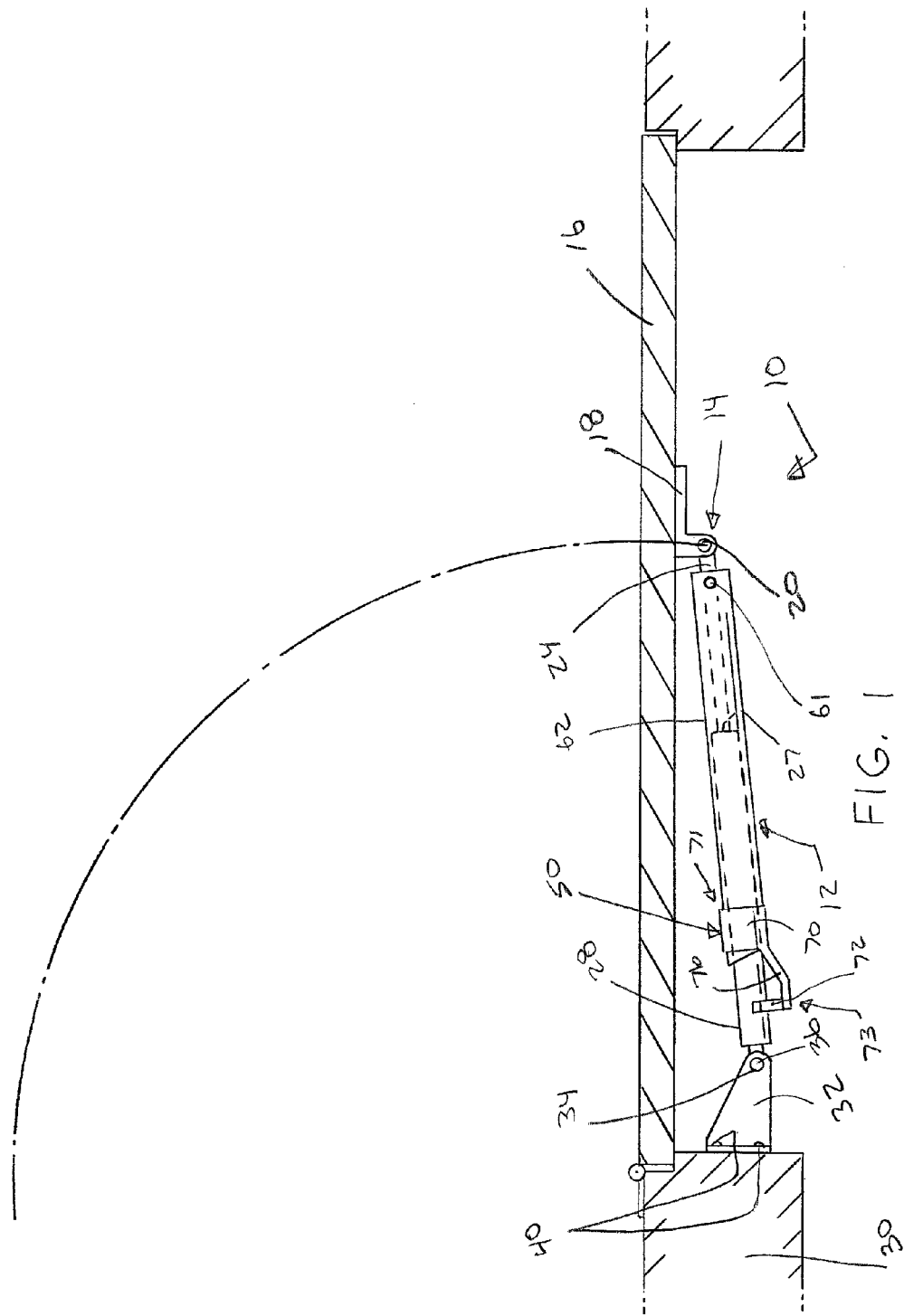
FIG. 1 is a top elevational view of a one non-limiting embodiment of the present invention showing a strut assembly and a universal stop tube in an inoperative, door closed position.
Figure 2:
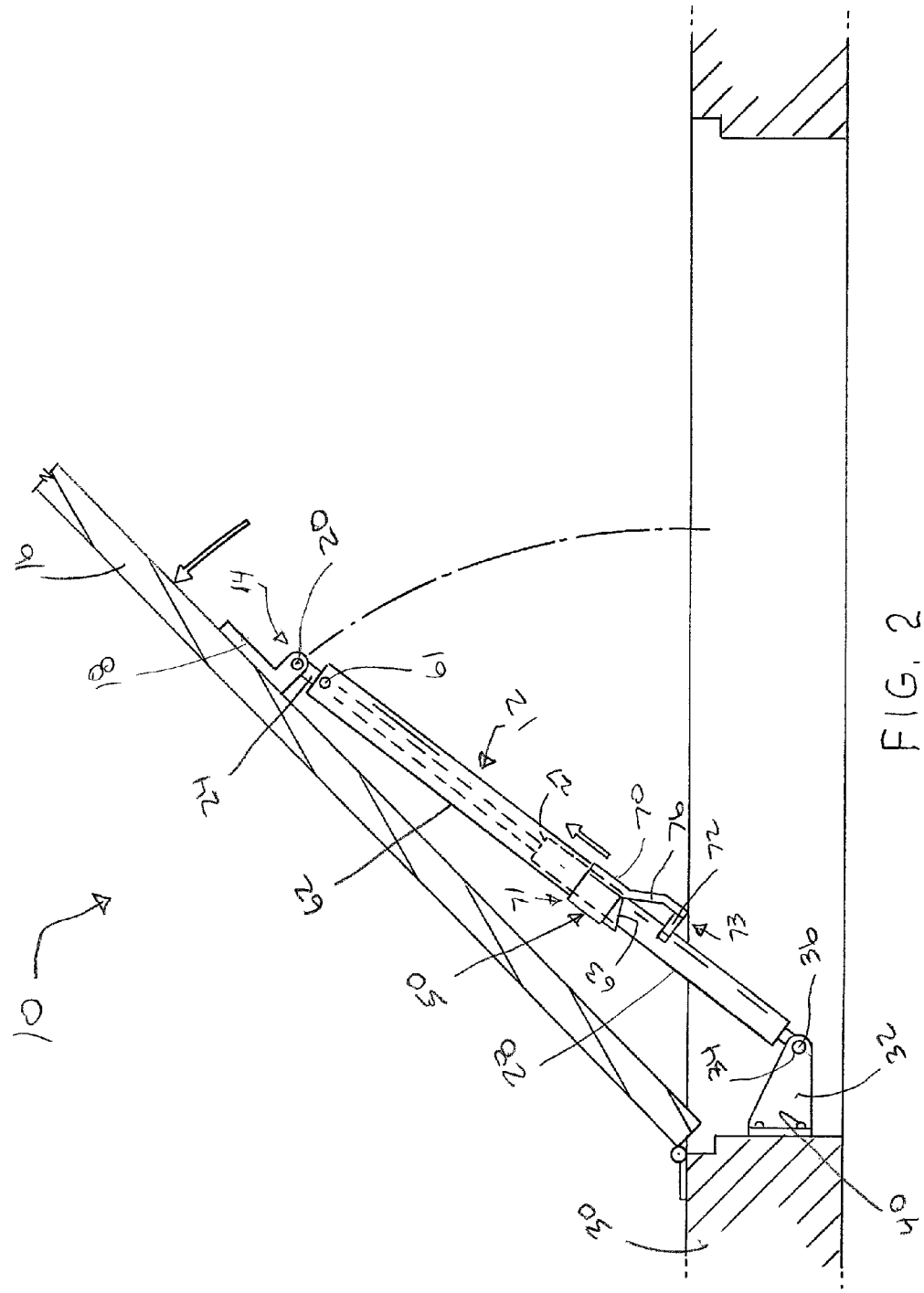
FIG. 2 is a top elevational view of the embodiment of the present invention of FIG. 1 showing the strut assembly and universal stop tube in an intermediate position (i.e. door partially open position); and, FIG. 3 is a top elevational view of the embodiment of the present invention of FIG. 1 showing the strut assembly and universal stop tube in the operative stop hold position (i.e. door fully open position).
Figure 10:
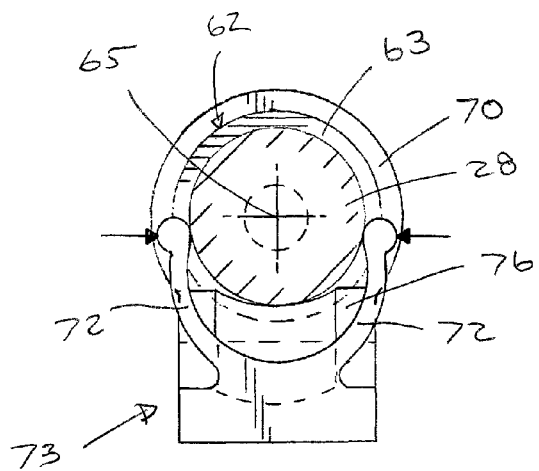
FIG. 10 is a cross sectional view taken along line 10-10 of FIG. 4.

Referring now to the drawings wherein the showing is for the purpose of illustrating non-limiting embodiments of the invention only and not for the purpose of limiting the same, there is illustrated in FIGS. 1-3 a door closer or strut assembly 10 that generally comprises a pneumatic spring, mechanical spring and/or hydraulic-type dampener cylinder 12 which is connected at a head end 14 to the door 16 by a bracket 18 through a pin 20 or other securing means. In one non-limiting arrangement, the strut assembly 10 includes a mechanical spring. In another non-limiting arrangement, the strut assembly 10 includes a mechanical spring in combination with a gas and/or fluid. In still another non-limiting arrangement, the strut assembly 10 is absent a mechanical spring and includes a gas and/or fluid. One end of a reciprocating piston rod or strut rod 24 can be operatively connected to a strut cylinder 28. Attached to the door casing, jamb or frame 30 at the side where the door is hinged is a frame bracket 32. The frame bracket 32 includes a means for connecting to the second end of the cylinder 12, such as a bracket aperture 34. Normally, an end portion of the strut rod 24 will include an aperture 34 which will allow a pin 36 to connect the strut rod 24 and the bracket 32. The frame bracket 32 generally includes mounting apertures 40 which are elongated to accommodate existing apertures in a door casing to allow for easy connection to the door frame 30.

Upon opening the door 16, the piston rod 24 which is attached to the door 16 by the bracket 18, is pulled out from within the strut cylinder 28. When the door 16 is then subsequently released, the cylinder 28 pulls against the strut rod 24, causing the rod 24 to be drawn back within the cylinder 28 and the door 16 is thus swung closed.

Making reference again to the drawings wherein like numerals indicate like or corresponding parts throughout the several figures, a new and improved door closer hold-open apparatus will be described. FIGS. 1-12 show a universal strut assembly according to a first embodiment of the present disclosure. The universal strut assembly includes strut cylinder 28, strut rod 24, stop tube 50, locking tube 62, and pivot block 60. The strut assembly 10 is shown as being substantially about a central axis 65 (defined by centers of the strut cylinder 28 and strut rod 24) which can extend, for example, the length of the closer between the frame pivot 36 on the frame bracket 32 at a first end to an opposing bracket 18 and pin 20 at a second end.

It is to be appreciated that the stop tube 50 can be used for a multitude of different applications and mountings, and retrofitted to any strut size. The locking tube 62 can be anchored at one end to the strut rod 24. The pivot block 60 enables the locking tube 62 to pivot about a pivot pin 61 relative to the strut rod 24. The pivot block 60 is proximal to the mounting frame bracket 18. The locking tube 62 can be a steel tube attached by sliding over the strut rod 24 and subsequently fastened to the strut rod 24 at one end by the pivot block 60. As can be appreciated, the locking tube can be made of other materials (e.g., plastic, composite materials, other metals, etc.). The locking tube 62 pivots about the pivot block 60 between a first position aligned with the central axis 65 (FIGS. 4, 5, and 10) and a second position not aligned with the central axis 65 (FIGS. 6, 9, 11, and 12). The inside of the locking tube 62 can optionally include metal, plastic, and/or nylon beads to facilitate movement between the locking tube 62, strut rod 24, and strut cylinder 28 (not illustrated). Beads can also be used to help prevent scratching of the adjacent surfaces between the locking tube 62, strut rod 24, and strut cylinder 28.

The stop tube 50 includes a collar 70 at one end 71 and a flexible clip 72 at another end 73. The clip end 73 is proximal to the strut cylinder 28 and distal to the pivot block 60. The collar end 71 surrounds the locking tube 62 at a location distal to the pivot block 60. The clip end 73 functions as a spring to hold the stop tube 50 in position. The stop tube 50 further includes a ramp or angled member 76 connecting the clip 72 and collar 70.

In operation according to the first embodiment, when the strut rod 24 is initially pulled from the strut cylinder 28, the clip end 72 rides along the outer circumference 29 of the strut cylinder 28. Once enough of the strut rod 24 has extended from the strut cylinder 28 and the strut cylinder 28 extends past the locking tube 62, the stop tube 50 'pulls' the locking tube 62 into the second position (while pivoting at the pivot block 60) out of alignment with the central axis of the strut cylinder 28. The 'pulling' of the locking tube 62 is activated automatically when the strut rod 24 reaches a predeterminable extended position. This results in an engagement between terminal ends of the strut cylinder 28 and locking tube 62 whereby the strut assembly 10 is held in a fixed predeterminable position. In particular, a terminal substantially flat section or portion of the terminal end 63 of the locking tube 62 mates with the terminal end 27 of the strut cylinder 28 while misaligning respective central axes of the locking tube 62 and strut cylinder 28 (FIG. 6). The misalignment prevents the strut cylinder 28 from sliding rectilinearly within the locking tube 62. It is to be appreciated that the length of the locking tube 62 and strut cylinder 28 can determine the fixed predeterminable position. FIGS. 1-3 show a relatively long locking tube 62; however, this is not required. The predeterminable locking position can be the full extended position of the strut rod 24 or some other position less than the full extended position.

A single push to the clip 72 deactivates the engagement of the strut cylinder 28 and the locking tube 62. Upon disengagement, the strut assembly 10 aligns itself and closes completely unassisted by any further action of an operator. To disengage the locking tube 62 and strut cylinder 28, the clip end 72 can be pushed towards the strut cylinder 28. The pressure expands the clip end 72 partially around the strut cylinder 28 thereby aligning the strut cylinder 28 and locking tube 62 about the same co-aligned central axis. The stop tube 50 holds the locking tube 62 in disengaged position until the strut cylinder 28 and locking tube 62 are partially closed. The stop tube 50 is 'reset' when the strut assembly 10 is closed partially after disengaging the locking tube 62 and strut cylinder 28. The ramp 76, between the clip 72 and collar 70, resets the stop tube 50 when assembly 10 begins to close after disengagement (FIG. 7). In the first embodiment, the angled portion or face 63 of the terminal end of the locking tube 62, along with the ramp 76, provides for the self-alignment between the strut cylinder 28 and the locking tube 62 about the central axis 65.

Figure 11:
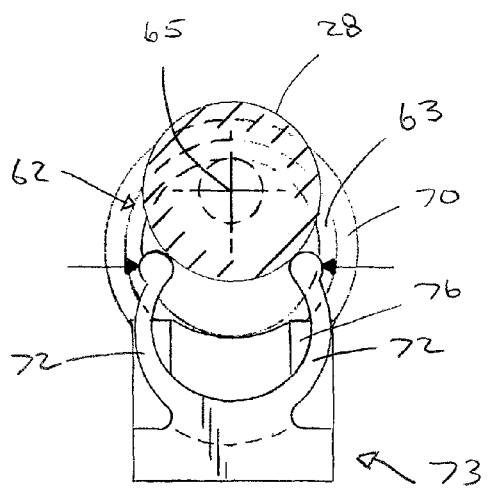
FIG. 11 is a cross sectional view taken along line 11-11 of FIG. 6.

In operation, it is to be appreciated that the clip 72 functions as a spring to hold the stop tube 50 and locking tube 62 in position. The c-shaped clamp or open ring of the clip 72 provides a spring force that pushes the stop tube 50 into a locked position (FIG. 11). The stop tube 50 "activates" automatically when the strut cylinder 28 reaches a predetermined extended position (FIGS. 5 and 6). The predetermined extended position can be the fully extended position or some other position less than the fully extended position.

To disengage the locking tube 62, a push is made to the clip 72 in a direction toward the strut cylinder 28, whereby the clip 72 holds the locking tube 62 in a disengaged position until the strut assembly 10 is partially closed. The ramp 76 "resets" the stop tube 50 when the strut assembly 10 initiates closing after disengagement. The ramp 76 and the angled face 63 of the locking tube 62 slides along the terminal end 27 of the strut cylinder 28 until the central axes of the strut cylinder 28 and the locking tube 62 are aligned, whereby the locking tube 62 slides rectilinearly over the strut cylinder 28 (FIGS. 7 and 8).

According to a second embodiment (FIGS. 13 and 14), when the strut rod 124 is initially pulled from the strut cylinder 128, the clip end 172 rides along the outer circumference 129 of the strut cylinder 128. Once enough of the strut rod 124 has extended from the strut cylinder 128 and the strut cylinder 128 extends past the locking tube 162, the stop tube 150 "pulls'" the locking tube 162 into the second position (while pivoting at the pivot block) out of alignment with the central axis of the strut cylinder 128. The pulling of the locking tube 162 is activated automatically when the strut rod 124 reaches a predeterminable extended position. This results in an engagement between terminal ends of the strut cylinder 128 and stop tube 150 whereby the strut assembly 110 is held in a fixed predeterminable position. In particular, a terminal flat section or portion 152 of the terminal end of the stop tube 150 mates with the terminal end 127 of the strut cylinder 128 while misaligning respective central axes of the locking tube 162 and strut cylinder 128. The misalignment prevents the strut cylinder 128 from sliding rectilinearly within the locking tube 162. The predeterminable locking position can be the full extended position of the strut rod 124 or some other position less than the full extended position. A single push to the clip 172 deactivates the engagement of the strut cylinder 128 and the stop tube 150.

Figure 13:
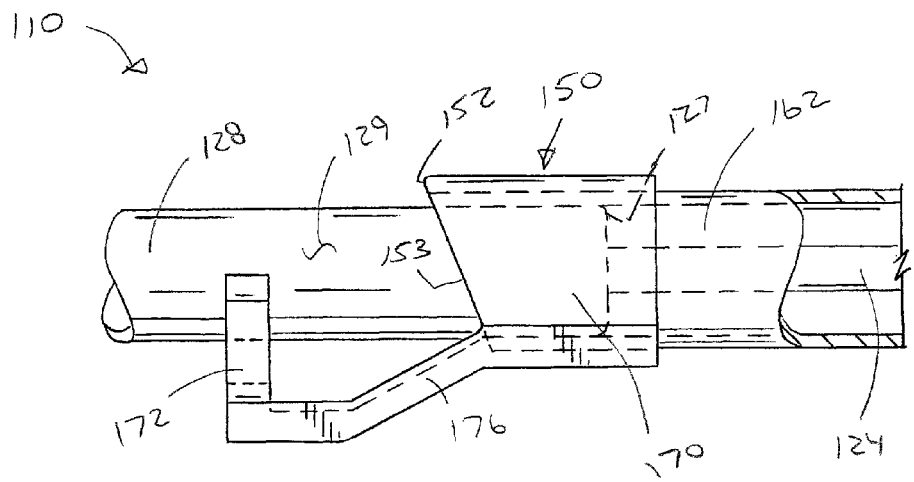
FIG. 13 is a partial cross sectional view of another non-limiting embodiment of a strut assembly and universal stop tube in an inoperative, door closed position; and, FIG. 14 is a partial cross sectional view of the embodiment of the strut assembly and universal stop tube of FIG. 13 in an operative, door open position.

To disengage the stop tube 150 and strut cylinder 128, the clip end 172 can be pushed towards the strut cylinder 128. The pressure expands the clip end 172 partially around the strut cylinder 128 thereby aligning the stop tube 150, strut cylinder 128, and locking tube 162 about the central axis (FIG. 13). The stop tube 150 holds the locking tube 162 in disengaged position until the strut cylinder 128 and locking tube 162 are partially closed. The stop tube 150 is "reset" when the strut assembly 110 is closed partially after the disengaging the terminal ends of the stop tube 150 and strut cylinder 128. The ramp 176, between the clip 172 and collar 170, resets the stop tube 150 when the strut assembly 110 is partially closed after disengagement. In the second embodiment, an angled portion or face 153 of the terminal end of the stop tube 150 provides for self-alignment between the strut cylinder 128 and the locking tube 162 about the central axis. It is to be appreciated that upon disengagement, the strut assembly 110 self-aligns and closes completely unassisted by any further action of an operator. The angled face 153 of the stop tube 150 and the ramp 176 slide along the terminal end 127 of the strut cylinder 128 until the central axes of the strut cylinder 128, stop tube 150, and locking tube 162 are aligned, whereby the locking tube 162 slides rectilinearly over the strut cylinder 128.

Figure 14:
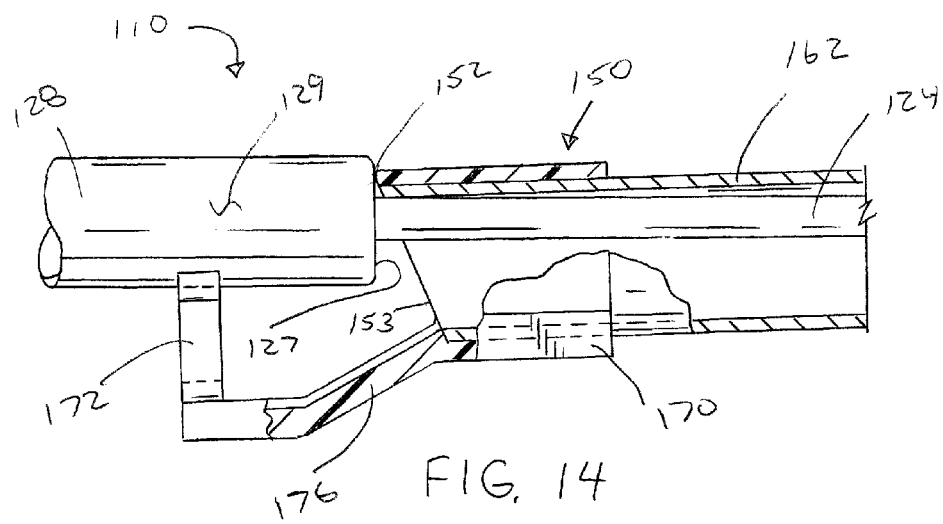

In operation, it is to be appreciated that the clip 172 functions as a spring to hold the stop tube 150 and strut cylinder 128 in position. The shape of the clip 172 provides a spring force that pushes the stop tube 150 into a locked position (FIG. 14). The stop tube 150 "activates" automatically when the strut cylinder 128 reaches a predetermined extended position. The predetermined extended position can be the fully extended position or some other position less than the fully extended position.

It is to be appreciated that the combination of stop tube and locking tube can come in a variety of sizes. The stop tube can be installed after strut construction and can be retrofitted to any strut (i.e., body size, rod size, stroke, etc.). As described above, the angled portion of either the locking tube or stop tube and the stop tube ramp, provide for a self-alignment mechanism for aligning the respective central axes of the strut cylinder, stop tube, and locking tube. The angled portion can be at or near the terminal ends of the stop tube or locking tube. The relative sizes of the stop tubes and locking tubes can be fitted for the respective applications, the desired amount of 'travel' or stroke between the strut and the strut rod, and the desired locking position.

One non-limiting feature of the invention is that the hold-open apparatus, including the angled portion, present on either the stop tube or locking tube. has distinct angular characteristics with respect to a vertical plane, i.e., the vertical plane aligned with the terminal end face of the strut cylinder, to maintain and release the retention forces between the respective components. In one arrangement, the angled portion 63 relative to the vertical plane is positioned from about 10 degrees to about 40 degrees 67, while the strut assembly is in the locked position or hold-open position. In another arrangement, the angled portion is positioned from about 20 degrees to about 30 degrees, with respect to the vertical plane in a predetermined direction as shown in FIG. 6. In the unlocked position, the angled portion changes orientation to an 'attack angle' less than the locked position angle. The unlocked position angle 69 is positioned from about 15 degrees to about 35 degrees from the vertical plane, while the strut cylinder and the locking tube are approaching alignment and then become aligned (FIG. 5) while the strut assembly is in the unlocked position and the central axes of the locking tube and the strut cylinder are aligned. Once the locking tube and the strut cylinder are aligned, the strut cylinder will move rectilinearly inside the locking tube (FIG. 8).

Figure 12:
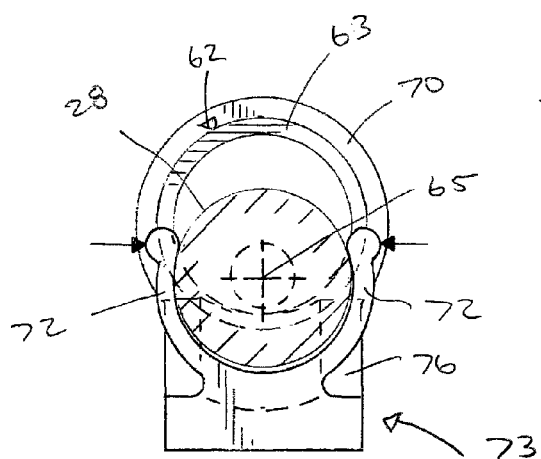
FIG. 12 is a cross sectional view taken along line 12-12 of FIG. 7.

To better understand the operation of the hold-open apparatus, it is noted that the locking tube of the hold-open apparatus moves primarily in a plane and also in a radial arc with respect to the pivot block first end of the hold-open apparatus. Thus, the locking tube moves in a plane defined by misaligned respective central axes of the locking tube and the strut cylinder (FIGS. 11 and 12). In use, the first end is located at the center of a circle and the second terminal end portion moves around a section of the radial edge of the circle (not illustrated). Accordingly, the hold-open apparatus of the present invention can advantageously be utilized as an add-on accessory for a door closer mechanism which is already in use with little retrofitting necessary and limited use of installation tools. Alternatively, the hold-open apparatus can be included on newly constructed door closer mechanisms fitted to screen and storm doors. The present invention provides a simple method for maintaining a door in a latched position, whether operated manually or automatically. The apparatus can be utilized by persons who have disabilities and cannot easily manipulate hands, fingers, digits, and/or bend over easily. Further, since the door can be activated to a hold-open position by simply opening the door, accidents that are caused by the closing door catching on the back of the legs or feet are minimized.

Another non-limiting advantage of the stop tube and locking tube combination described above is that there is no oil to introduce, monitor, leak, and/or replace. In addition, there are no seals required, and thus, no seals to wear out or replace with respect to the engagements and interactions of the stop tube and locking tube as part of the strut assembly. Additionally, it is to be appreciated that 100 percent of the unintended closure force is taken up or resisted by the point-to-point contact of the locking tube with the strut cylinder, or by the point-to-point contact of the stop tube with the strut cylinder (i.e., rigid metal components).

The hold-open apparatus can be designed so as to be variable in length as known in the art to accommodate the user's choice of operation and angle of the door open position, etc. The locking tube and stop tube of the hold-open apparatus length may be varied to accommodate a particular application.

To better understand the operation of the hold-open apparatus, it is noted that the locking tube of the hold-open apparatus moves primarily in a plane and also in a radial arc with respect to the pivot block first end of the hold-open apparatus. In use, the first end is located at the center of a circle and the second terminal end portion moves around a section of the radial edge of the circle. Accordingly, the hold-open apparatus of the present invention can advantageously be utilized as an add-on accessory for a door closer mechanism which is already in use with little retrofitting necessary and limited use of installation tools. Alternatively, the hold-open apparatus can be included on newly constructed door closer mechanisms fitted to screen and storm doors. The present invention provides a simple method for maintaining a door in a latched position, whether operated manually or automatically. The apparatus can be utilized by persons who have disabilities and cannot easily manipulate hands, fingers, digits, and/or bend over easily. Further, since the door can be activated to a hold-open position by simply opening the door, accidents that are caused by the closing door catching on the back of the legs or feet are minimized.

The advantage in all cases to the user and as compared to other similar devices is that the apparatus can be operated completely automatically by simply opening the door without any additional manual operation. This feature is particularly advantageous when the user has both hands full when entering, or when assisting others since the door can be automatically locked open and disengaged by simply moving the stop tube.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed is:

1. A strut assembly including a holding and releasing mechanism adapted to be attached to a cylinder closer, said strut assembly comprising: a strut cylinder, a strut rod, a pivot block, a locking tube, and a stop tube, said stop tube including a clip at a first end and a collar at a second end, said stop tube including a rigid angled ramp connecting said clip and said collar, said clip movable from a first position to a second position while pivoting said locking tube at a first end in order to engage said locking tube at another end with said strut cylinder thereby holding said strut assembly in an extended position.

2. The assembly according to claim 1, wherein said locking tube is pivotally engaged at said first end to said strut rod proximal to a mounting frame bracket.

3. The assembly according to claim 2, wherein said locking tube includes an angled second end distal to said mounting frame bracket.

4. The assembly according to claim 2, wherein said locking tube moves in a radial arc relative to said first end.

5. The assembly according to claim 3, wherein said angled second end further includes a flat section orthogonal to a central axis of said locking tube.

6. The assembly according to claim 3, wherein said clip includes a deformable open ring movable from said first position to said second position.

7. The assembly according to claim 5, wherein said second position holds said flat section terminal end of said angled second end against a terminal end of said strut cylinder.

8. A strut assembly including a holding and releasing mechanism adapted to be attached to a cylinder closer, said strut assembly comprising: a strut cylinder, a strut rod, a pivot block, a locking tube, and a stop tube, said stop tube including a clip at a first end and a collar at a second end, said stop tube including a rigid angled ramp connecting said clip and said collar, said clip movable from a first position to a second position while pivoting said locking tube at a first end in order to engage said locking tube at another end with said strut cylinder thereby holding said strut assembly in an extended position, said stop tube includes an angled second end distal to a mounting frame bracket.

9. The assembly according to claim 8, wherein said locking tube is pivotally engaged at said first end to said strut rod proximal to said mounting frame bracket, wherein said locking tube moves in a radial arc relative to said first end.

10. The assembly according to claim 8, wherein said angled second end further includes a flat section orthogonal to a central axis of said stop tube.

11. The assembly according to claim 8, wherein said clip includes a deformable open ring movable from said first position to said second position.

12. The assembly according to claim 10, wherein said second position holds said flat section terminal end of said angled second end against a terminal end of said strut cylinder.

13. A strut assembly including a holding and releasing mechanism adapted to be attached to a cylinder closer, said strut assembly comprising: a strut cylinder, a strut rod, a pivot block, a locking tube, and a stop tube, said stop tube including a clip at a first end and a collar at a second end, said stop tube including a rigid angled ramp connecting said clip and said collar, said clip movable from a first position to a second position while pivoting said locking tube at a first end in order to engage said locking tube at another end with said strut cylinder thereby holding said strut assembly in an extended position, said stop tube includes an angled second end distal to a mounting frame bracket, said locking tube pivotally engaged at said first end to said strut rod proximal to said mounting frame bracket.

14. The assembly according to claim 13, wherein said angled second end further includes a flat section orthogonal to a central axis of said stop tube.

15. The assembly according to claim 13, wherein said clip includes a deformable open ring movable from said first position to said second position.

16. The assembly according to claim 14, wherein said second position holds said flat section terminal end of said angled second end against a terminal end of said strut cylinder.

17. The assembly according to claim 13, wherein said locking tube moves in a radial arc relative to said first end and in a plane defined by misaligned respective central axes of said locking tube and said strut cylinder.

18. A strut holding and releasing mechanism adapted to be attached to a cylinder closer, said mechanism comprising a stop tube, a locking tube, and a pivot block, said stop tube including a clip at a first end and a collar at a second end, said stop tube including a rigid angled ramp connecting said clip and said collar, said locking tube adapted for mounting to the cylinder closer at a locking tube first end, said clip movable from a first position to a second position while pivoting said locking tube at said first end in order to engage said locking tube at a second end with the cylinder closer thereby holding the cylinder closer in an extended position, said stop tube, said locking tube, or combination thereof includes an angled second end distal to said locking tube first end.

19. The mechanism according to claim 18, wherein said locking tube pivots from an aligned orientation with a central axis of the cylinder closer in said first position to a misaligned orientation with the central axis of the cylinder closer in said second position.

20. The mechanism according to claim 18, wherein said clip includes a deformable open c-clamp movable from said first position to said second position.

21. The mechanism according to claim 19, wherein said angled second end and said angled ramp automatically aligns a central axis of said locking tube with the central axis of the cylinder closer as said clip moves from said second position to said first position.

22. The mechanism according to claim 18, wherein said locking tube moves in a radial arc relative to said locking tube first end and in a plane defined by misaligned respective central axes of said locking tube and the cylinder closer.

* * * * *